United States Patent
Kline et al.

(10) Patent No.: US 10,150,233 B2
(45) Date of Patent: *Dec. 11, 2018

(54) METHOD AND APPARATUS FOR REDUCING PLY WRINKLING OF COMPOSITE LAMINATES DURING FORMING

(71) Applicant: The Boeing Company, Chicago, IL (US)

(72) Inventors: William Thomas Kline, Burien, WA (US); Christopher Gary Harris, Auburn, WA (US); Andrew M. Hopkins, Salt Lake City, UT (US); Donald John Sutkus, Jr., Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/660,668

(22) Filed: Mar. 17, 2015

(65) Prior Publication Data
US 2015/0183171 A1 Jul. 2, 2015

(51) Int. Cl.
*B29C 70/56* (2006.01)
*B29C 70/34* (2006.01)
(Continued)

(52) U.S. Cl.
CPC ........ *B29C 43/3642* (2013.01); *B29C 70/342* (2013.01); *B29C 70/541* (2013.01);
(Continued)

(58) Field of Classification Search
CPC ..... B29C 33/00; B29C 39/00; B29C 43/3642; B29C 70/342; B29C 70/541; B29C 70/56;
(Continued)

(56) References Cited

U.S. PATENT DOCUMENTS

| 4,816,106 A | * | 3/1989 | Turris | B29C 43/3642 156/285 |
| 5,080,851 A | * | 1/1992 | Flonc | B29B 11/16 156/222 |

(Continued)

FOREIGN PATENT DOCUMENTS

| DE | 102010043665 A1 | 5/2012 |
| EP | 1393875 A1 | 3/2004 |

(Continued)

OTHER PUBLICATIONS

Ott, "Composite Hot Drape Forming," Boeing Defense & Space Group Operations Technology, Helicopters Division, Document No. N94-30448, copyright 1994, pp. 74-80.

(Continued)

*Primary Examiner* — William P Bell
(74) *Attorney, Agent, or Firm* — Yee & Associates, P.C.

(57) ABSTRACT

Ply wrinkling during hot drape forming of a composite laminate is reduced at outside corner radii of a forming tool. First and second tensioning materials placed between a composite laminate charge and the forming tool maintain the laminate charge in tension at the radius corners as the charge is formed down over corner radii.

14 Claims, 17 Drawing Sheets

(51) Int. Cl.
*B29C 43/36* (2006.01)
*B29C 70/54* (2006.01)
*B29L 9/00* (2006.01)

(52) U.S. Cl.
CPC ...... *B29C 70/56* (2013.01); *B29C 2043/3644* (2013.01); *B29L 2009/00* (2013.01)

(58) Field of Classification Search
CPC .... B29C 2043/3644; B29C 2043/3647; B29C 2043/3649; B29C 2043/3657; B29C 43/12; B29L 2009/00; B30B 5/02; B30B 9/22
USPC ....................................................... 156/245
See application file for complete search history.

(56) References Cited

U.S. PATENT DOCUMENTS

| | | | | |
|---|---|---|---|---|
| 5,145,621 | A * | 9/1992 | Pratt | B29C 33/30 156/245 |
| 5,348,602 | A * | 9/1994 | Makarenko | B29C 70/44 156/160 |
| 5,464,337 | A | 11/1995 | Bernardon et al. | |
| 5,597,631 | A * | 1/1997 | Furumoto | B29C 70/086 428/34.5 |
| 5,772,950 | A * | 6/1998 | Brustad | B29C 53/025 156/222 |
| 6,814,916 | B2 | 11/2004 | Willden et al. | |
| 7,118,370 | B2 | 10/2006 | Willden et al. | |
| 8,236,222 | B2 | 8/2012 | Henderson et al. | |
| 2002/0012591 | A1 | 1/2002 | Montague et al. | |
| 2003/0146543 | A1 | 8/2003 | Lebrun et al. | |
| 2005/0183818 | A1* | 8/2005 | Zenkner | B29C 70/342 156/285 |
| 2007/0194491 | A1* | 8/2007 | Krogager | B29C 70/34 264/258 |
| 2009/0091052 | A1* | 4/2009 | Pridie | B29C 43/3642 264/40.5 |
| 2011/0097554 | A1* | 4/2011 | Kehrl | B29C 70/207 428/174 |
| 2011/0127698 | A1* | 6/2011 | Alenby | B29C 70/44 264/510 |
| 2011/0192535 | A1* | 8/2011 | Turner | B29C 43/28 156/266 |
| 2012/0164373 | A1* | 6/2012 | Spencer | C08G 59/1488 428/116 |
| 2012/0296002 | A1* | 11/2012 | Aruga | C08J 7/123 522/156 |
| 2012/0312459 | A1* | 12/2012 | De Mattia | B29C 53/04 156/212 |
| 2013/0221583 | A1* | 8/2013 | Crassous | B29C 33/3814 264/571 |
| 2014/0119940 | A1* | 5/2014 | Krishnamurthy | F03D 1/0675 416/241 R |
| 2014/0284836 | A1* | 9/2014 | Kline | B29C 70/342 264/101 |

FOREIGN PATENT DOCUMENTS

| | | | | |
|---|---|---|---|---|
| FR | 2689809 | A1 * | 10/1993 | ......... B29C 43/3642 |
| FR | 2983429 | A1 * | 6/2013 | ........... B29C 70/342 |
| WO | 2009044194 | A2 | 4/2009 | |
| WO | 2012099512 | A1 | 7/2012 | |

OTHER PUBLICATIONS

PCT search report dated Sep. 2, 2014 regarding application PCT/US2014/018346, applicant's reference 12-1329-PCT, applicant The Boeing Company, 7 pages.
Kline et al., "Method and Apparatus for Reducing Ply Wrinkling of Composite Laminates During Forming," U.S. Appl. No. 13/847,046, filed Mar. 19, 2013, 36 pages.
International Search Report and Written Opinion, dated Dec. 5, 2014, regarding Application No. PCT/US2014/018346, 17 pages.
The State Intellectual Property Office of China First Notification of Office Action and partial English Translation regarding Application No. 201480009846.X, dated Sep. 1, 2016, 16 pages.
Office Action, dated Jan. 20, 2016, regarding U.S. Appl. No. 13/847,046, 30 pages.
Final Office Action, dated Jul. 15, 2016, regarding U.S. Appl. No. 13/847,046, 7 pages.
Notice of Allowance, dated Sep. 8, 2016, regarding U.S. Appl. No. 13/847,046, 7 pages.

* cited by examiner

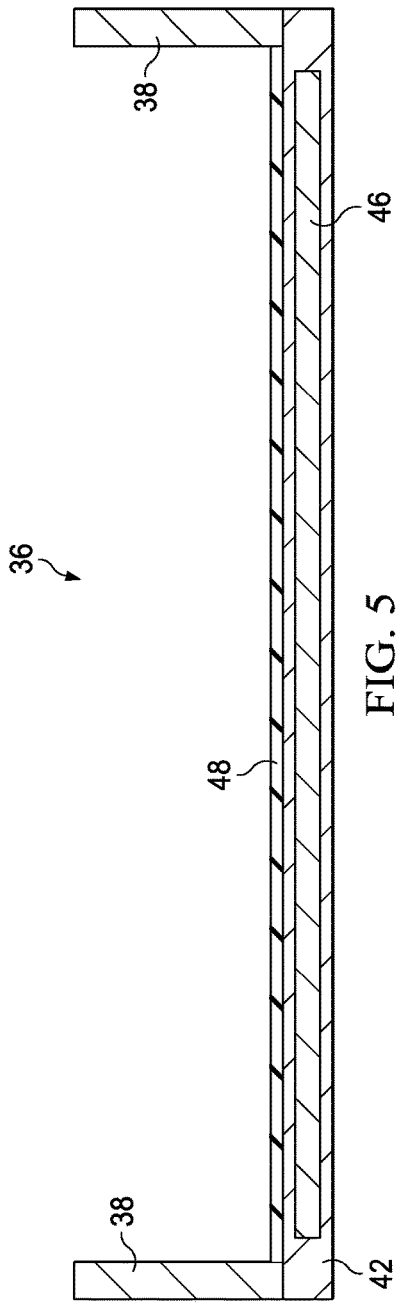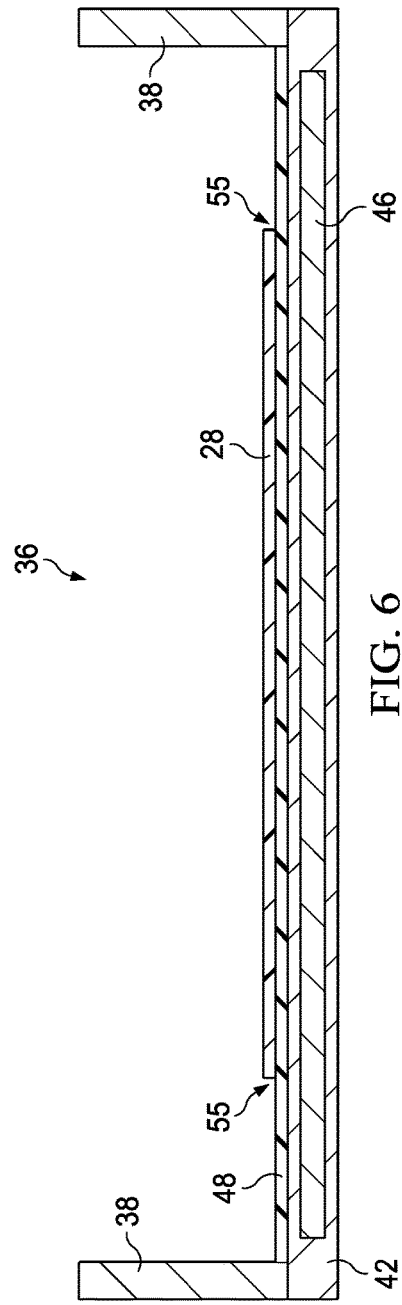

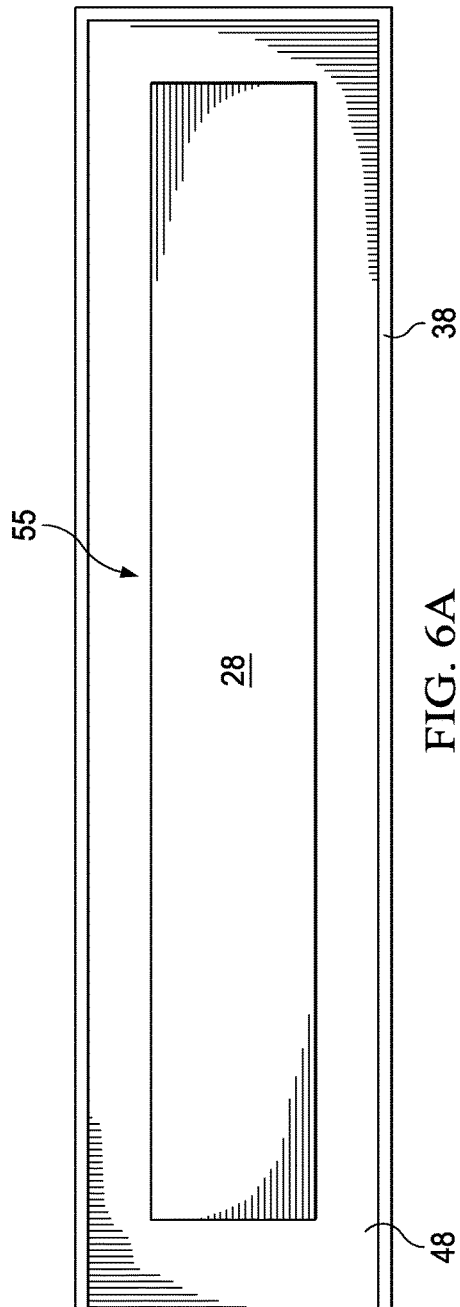
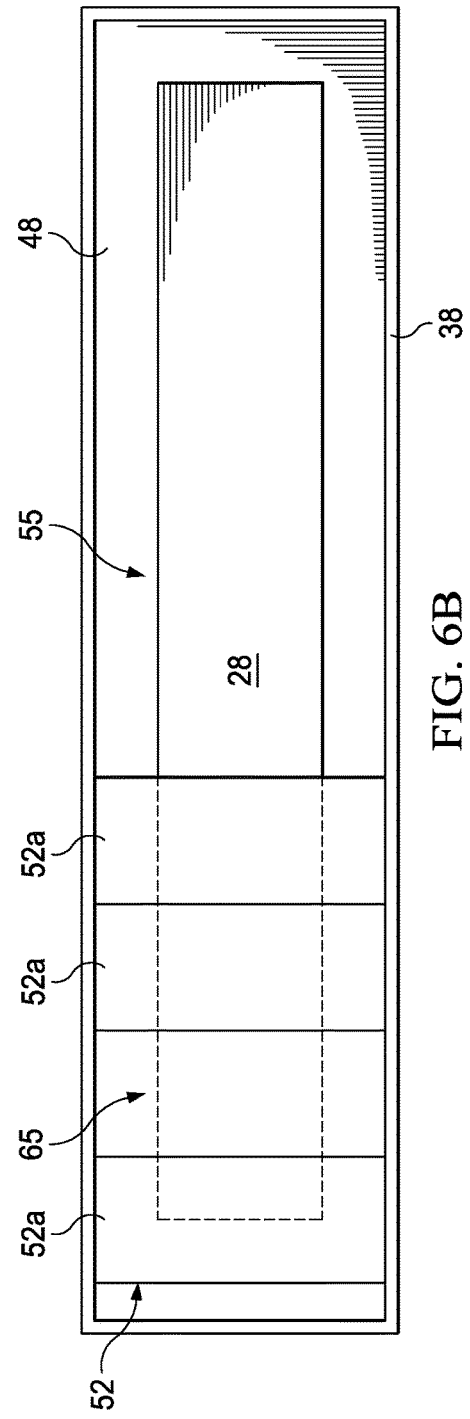
FIG. 6A
FIG. 6B

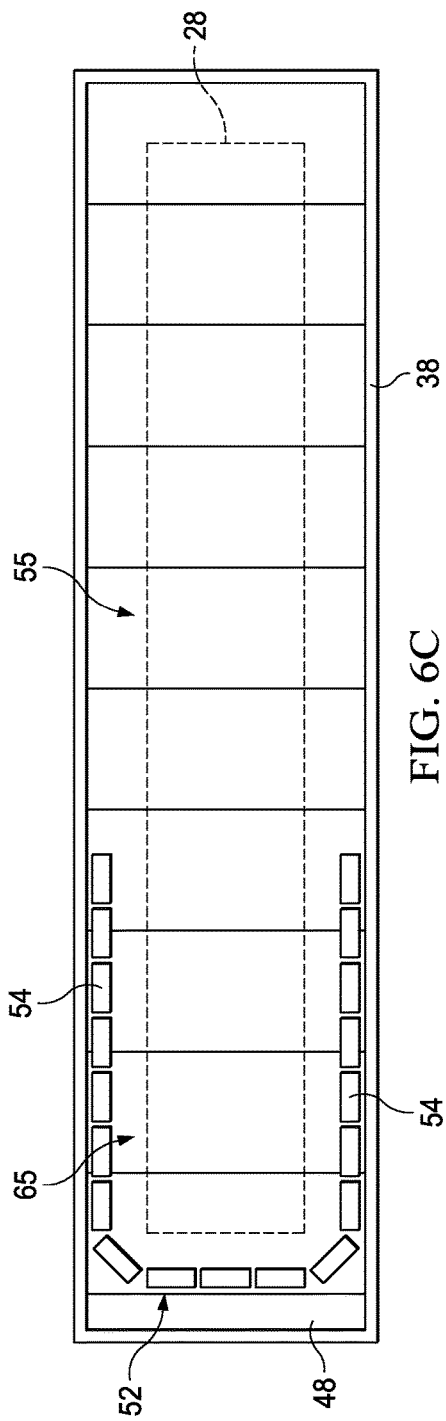
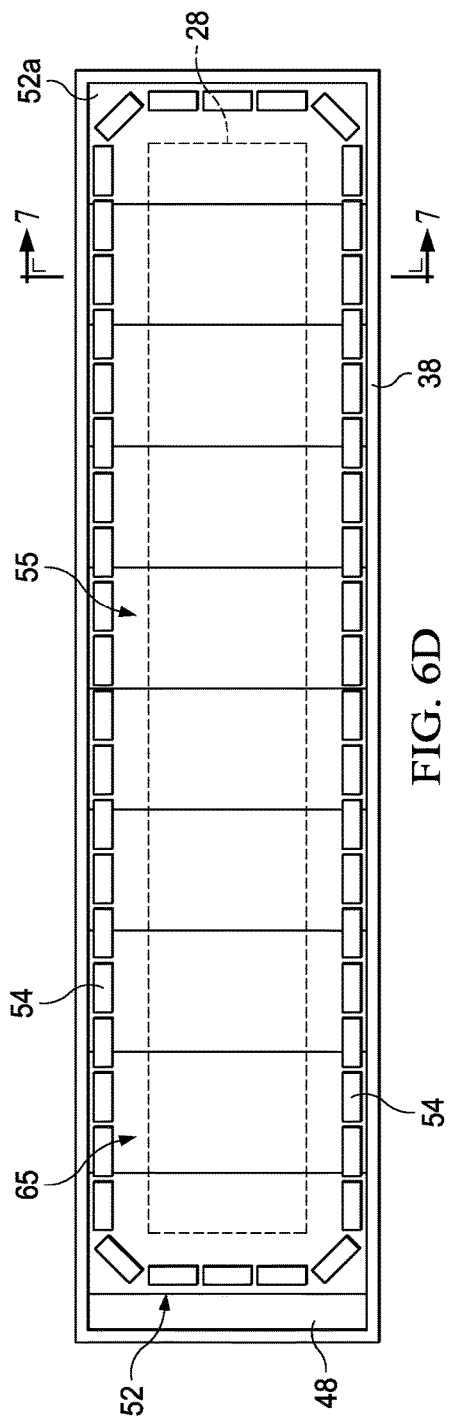
FIG. 6C
FIG. 6D

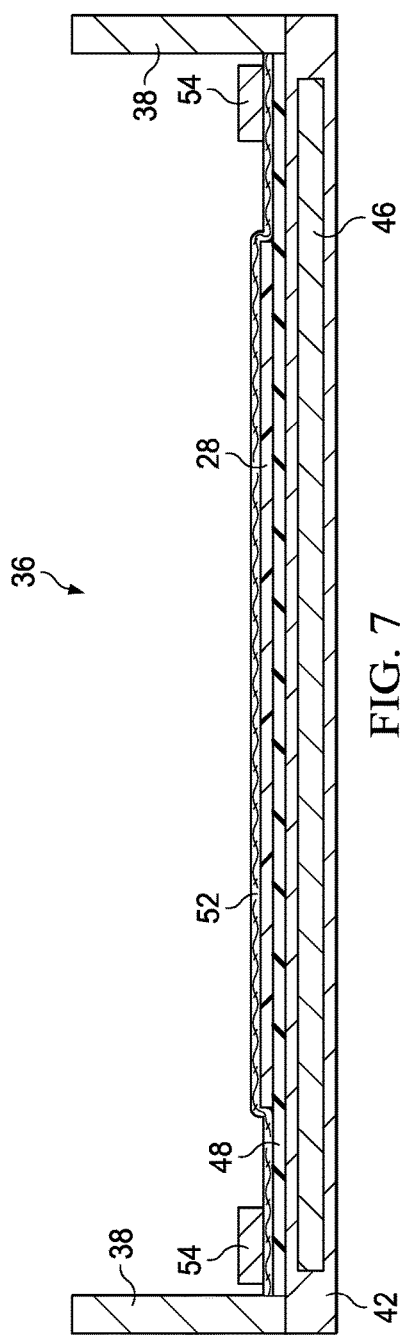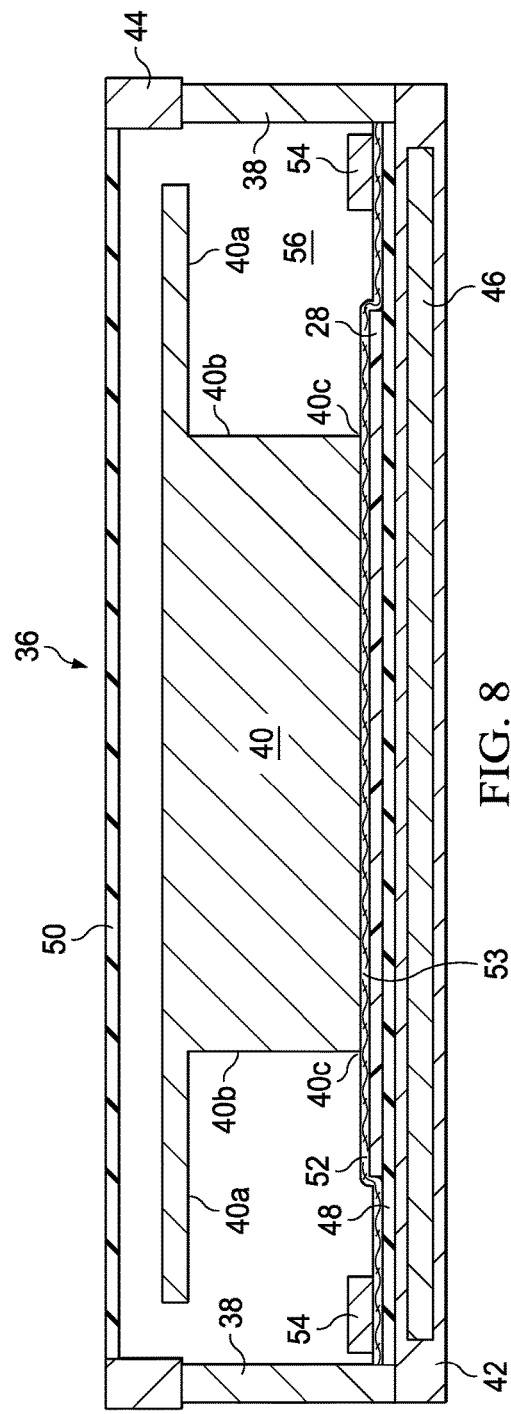

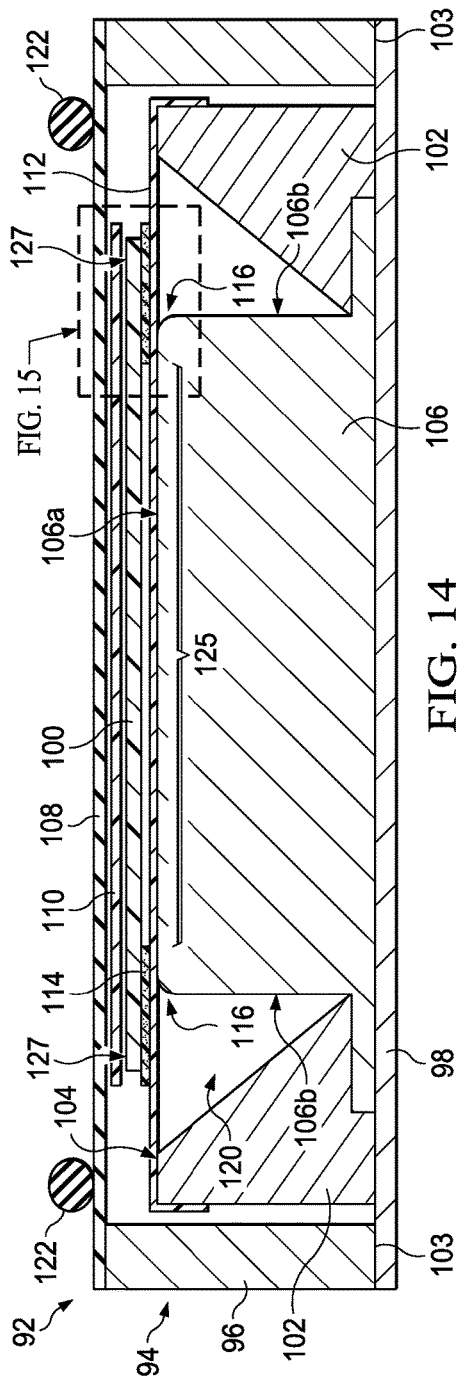
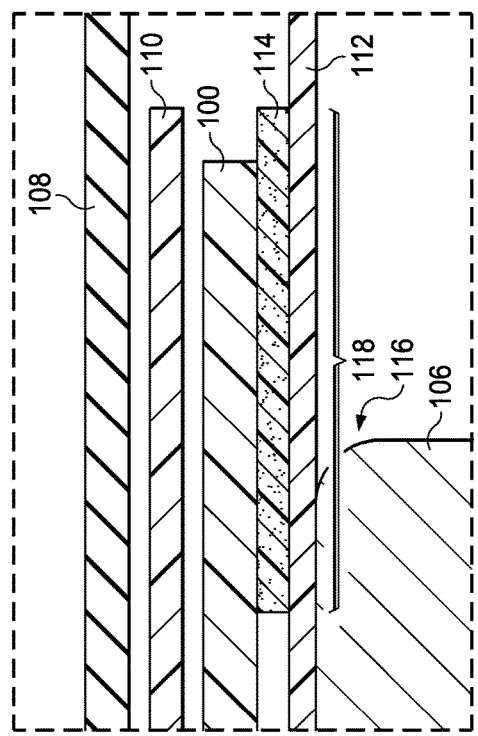
FIG. 14
FIG. 15

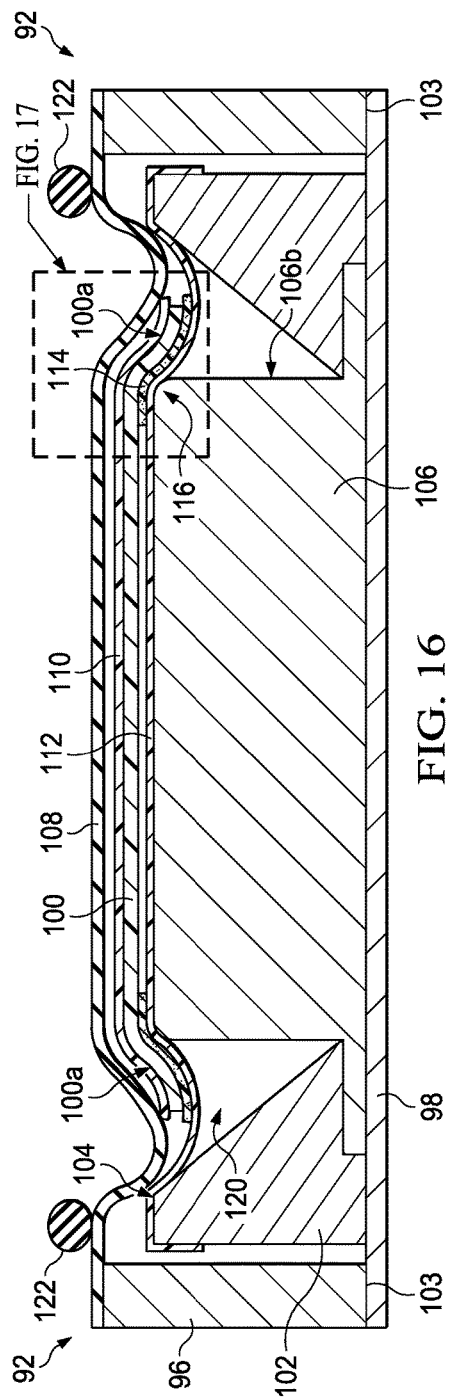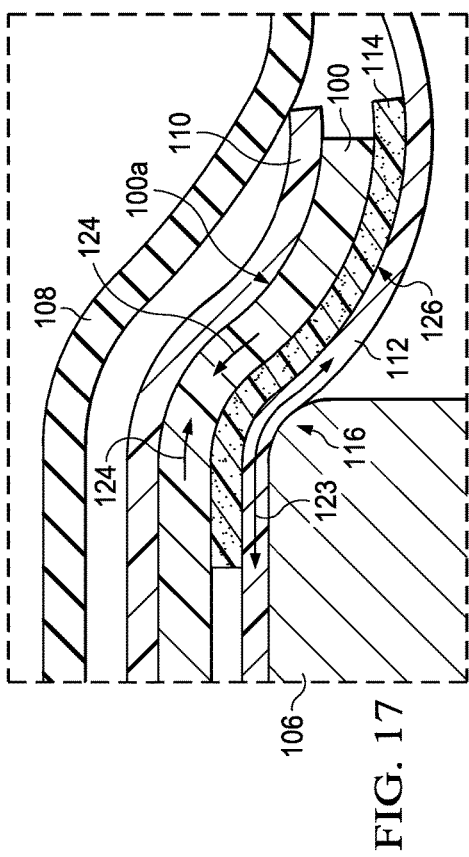

METHOD AND APPARATUS FOR REDUCING PLY WRINKLING OF COMPOSITE LAMINATES DURING FORMING

CROSS REFERENCE TO RELATED APPLICATIONS

This application is a continuation-in-part of prior co-pending U.S. patent application Ser. No. 13/847,046 filed Mar. 19, 2013, the entire disclosure of which is incorporated by reference herein.

BACKGROUND INFORMATION

1. Field

The present disclosure generally relates to processes for forming composite laminates, and deals more particularly with a method and apparatus for reducing ply wrinkling during hot drape forming of radius features.

2. Background

Hot drape forming may be used to form features such as flanges of a composite laminate part such as a stiffener. Hot drape forming is carried out by clamping and stretching a laminate charge in a frame, and heating it until soft enough to form. A pressure differential is then applied to the charge to form it over a shaped male tool. In one version of the process, known as top down forming, a compacted laminate charge is heated and formed down over a mandrel-like male tool. In another version of the process, referred to as inverted forming, the laminate charge is placed on a forming table, and a male tool is inverted and placed on top of the laminate charge. After the laminate charge is heated to forming temperature, a vacuum bladder beneath the laminate charge forms the charge upwardly onto and over the male tool.

Using either version of hot drape forming process described above, problems may be encountered when forming part features having relatively sharp radius corners. For example, when forming a composite angle stiffener having an inside radius corner between a flange and a web, the ply material closest to the male tool has a tendency to bunch, gather and form creases or wrinkles that may affect the mechanical performance of the stiffener. In some cases, the completed stiffener may be reworked to reduce creasing/wrinkling, while in other cases the stiffener must be scrapped. In either case, the problem of ply material creasing/wrinkling increases labor and/or material costs. The problem of ply wrinkling described above may be particularly challenging where the laminate charge contains a large number of plies and/or is to be formed around a tight outside corner tool radius.

Accordingly, there is a need for a method and apparatus which substantially reduces or eliminates ply material creasing/wrinkling during hot drape forming of composite laminate parts having radius features. There is also a need for a method and apparatus of the type mentioned above which is cost-effective, easily implemented and which may reduce material and/or labor costs.

SUMMARY

The disclosed embodiments provide a method and apparatus for hot drape forming composite laminates which may reduce or eliminate ply wrinkling along radius features, such as inside radius corners of a part. Ply wrinkling is reduced by tensioning the plies that are closest to the IML of the part along an inside corner radius during the forming process. Tension is applied to these plies by placing tensioning materials between the charge and the tool. The tensioning materials maintain tension on the charge plies closest to the IML surface as the charge is formed down over an outside radius corner of a forming tool. The applied surface tension counteracts compressive forces in these plies caused by bending of the plies during the forming process. The reduction or elimination of these compressive forces in the plies nearest the IML prevents the plies from bunching and wrinkling during the forming process. In one embodiment, tensioning strips are placed between a tensioning film and the charge at the outside radius corners of a forming tool in order to transfer tension in the film to the IML surface of the laminate charge. The reduction or elimination of ply wrinkling may reduce the need for reworking composite laminate parts, thereby reducing labor costs. Part scrap may also be reduced, thereby reducing material costs. The method and apparatus may be easily implemented without additional tooling, using simple, low-cost materials.

According to one disclosed embodiment, a method is provided of hot drape forming a composite laminate charge on a forming tool that reduces ply wrinkling. The method comprises placing a first tensioning material on the forming tool, placing the first tensioning material in tension, and placing a composite laminate charge on the forming tool overlying the first tensioning material. The method also includes placing a second tensioning material on the first tensioning material and hot drape forming the laminate charge over the forming tool, including transferring the tension in the first tensioning material through the second tensioning material to the laminate charge. The method may further comprise placing a forming membrane over the tensioning material and the laminate charge, and generating a forming force by drawing a vacuum beneath the forming membrane. The forming of the laminate charge over the forming tool is performed using the forming force generated by the forming membrane. The method includes adhering the second tensioning material to the laminate charge and to the first tensioning material. The method may also comprise holding opposite edges of the first tensioning material against movement, and stretching the first tensioning material down onto sides of the forming tool. The method may still further comprise placing the first tensioning material on spaced-apart towers each having an upper surface, holding the opposite edges of the first tensioning material respectively against the upper surfaces of the towers, placing a vacuum membrane over the first tensioning material, and drawing a vacuum beneath the vacuum membrane. Placing the second tensioning material includes placing a strip of prepreg on the first tensioning material aligned with a corner of the forming tool. The method may also include placing the forming tool on a forming table having first and second, opposite sidewalls, and a base, and placing first and second spaced apart towers on the base, wherein each of the towers is disposed between the forming tool and one of the first and second sidewalls, placing a forming membrane over the forming tool, and forming a vacuum cavity, including sealing the first and second sidewalls to the base.

According to another disclosed embodiment, a method is provided of hot drape forming a composite laminate part on a forming tool having at least one outside radius corner. The method comprises placing a tensioning film over the forming tool and spanning the outside radius corner, placing the tensioning film in tension and placing a composite laminate charge on the tensioning film aligned with the forming tool. The method further comprises adhering the tensioning film to the laminate charge along the outside radius corner of the forming tool, placing the tensioning film in tension, and forming the laminate charge down over the forming tool. Adhering the tensioning film to the laminate charge includes placing a strip of material having tack between the tensioning film and the laminate charge. Placing the strip of material includes placing a strip of prepreg on the tensioning film aligned with the outside radius corner. The method may also include wetting out the prepreg within an area aligned with the outside radius corner. Adhering the tensioning film to the laminate charge includes placing an adhesive on the tensioning film aligned with the outside radius corner. In another variation, adhering the tensioning material to the laminate charge includes treating the surface of the tensioning film in contact with the laminate charge to improve its adhesion along the outside radius corner of the laminate charge. Placing the tensioning film in tension includes holding opposite edges of the tensioning film on a pair of towers, and stretching the tensioning film down over the forming tool.

According to another disclosed embodiment, apparatus is provided for hot drape forming a composite laminate part having at least a first inside radius corner. The apparatus includes a forming tool having at least a first outside radius corner for forming the first inside radius corner of the laminate part, and a first tensioning material extending over the first outside radius corner and configured to have a composite laminate charge placed thereon. The apparatus further includes a forming membrane for forming the laminate charge down over the forming tool and placing the first tensioning material in tension, and a second tensioning material. The second tensioning material is sandwiched between the first tensioning material and the laminate charge. The second tensioning material is aligned over the first outside radius corner of the forming tool and transfers tension from the first tensioning material to the laminate charge at the inside radius corner of the laminate part. The first tensioning material may be, but is not limited to, a stretchable, ethylene tetrafluoroethylene film. The second tensioning material may be a prepreg. The second tensioning material possesses adhesive properties adhering the second tensioning material to the first tensioning material at the first inside radius corner of the part. The apparatus may further comprise a pair of laterally spaced, tensioning towers. The first tensioning material is stretchable and includes opposite edges respectively fixed on the tensioning towers.

According to still another disclosed embodiment, apparatus is provided for hot drape forming a composite laminate part having a pair of spaced apart inside radius corners. The apparatus comprises a forming tool configured to have a composite laminate charge formed thereover. The forming tool includes a pair of spaced apart outside radius corners respectively matching a geometry of the inside radius corners of the part. The apparatus further comprises a stretchable tensioning film stretched over the forming tool and configured to have a composite laminate charge placed thereon, and a forming membrane extending over the forming tool and configured to form the laminate charge down over the forming tool and place the stretchable tensioning film in tension. The apparatus further comprises first and second strips of material sandwiched between the stretchable tensioning film and the laminate charge. The first and second strips of material extend along the outside radius corners of the forming tool. The first and second strips of material are configured to transfer tension in the stretchable tensioning film to the laminate charge at the inside radius corners of the part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is an illustration of a cross-sectional view of the forming table forming part of the machine shown in FIG. 4.

FIG. 6 is an illustration similar to FIG. 5 but showing a composite laminate charge having been placed on the forming table, overlying a lower forming membrane.

FIG. 6A is an illustration of a plan view of the forming table with a composite laminate charge having been placed thereon.

FIG. 6B is an illustration of a plan view similar to FIG. 6A, but showing several sheets of the tensioning material having been placed on the forming table, overlying the laminate charge.

FIG. 6C is an illustration of a plan view similar to FIG. 6B, but showing the remainder of the tensioning material sheets having been placed on the forming table, with tensioning weights having been placed partially around the perimeter of the tensioning material.

FIG. 6D is an illustration of a plan view similar to FIG. 6C, but showing the remainder of the tensioning weights placed around the perimeter of the tensioning material.

FIG. 7 is an illustration of a cross-sectional view taken along the line 7-7 in FIG. 6D.

FIG. 8 is an illustration of a cross-sectional view of the forming table, a male forming tool and an upper membrane having been installed.

FIG. 14 is an illustration of a cross-sectional view taken along the line 14-14 in FIG. 13, certain of the material layers being slightly exploded for clarity.

FIG. 15 is an illustration of the area designated as FIG. 15 in FIG. 14.

FIG. 16 is an illustration similar to FIG. 14, but showing the composite laminate charge having been partially formed during an initial stage of the forming process.

FIG. 17 is an illustration of the area designated as FIG. 17 in FIG. 16.

DETAILED DESCRIPTION

Figure 1:
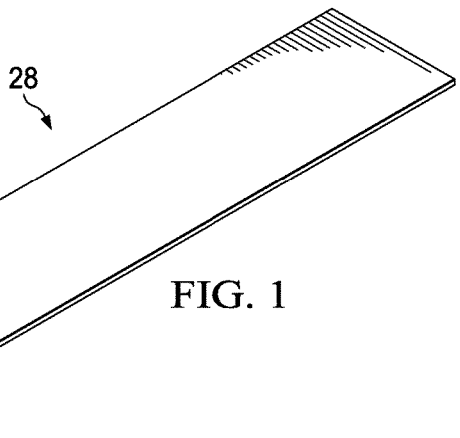
FIG. 1 is an illustration of a perspective view of a composite laminate charge.
Figure 2:
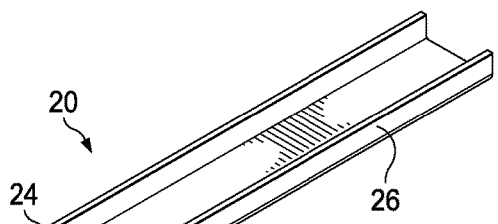
FIG. 2 is an illustration of a perspective view of a U-shaped channel stiffener produced by hot drape forming of the laminate charge shown in FIG. 1.
Figure 3:
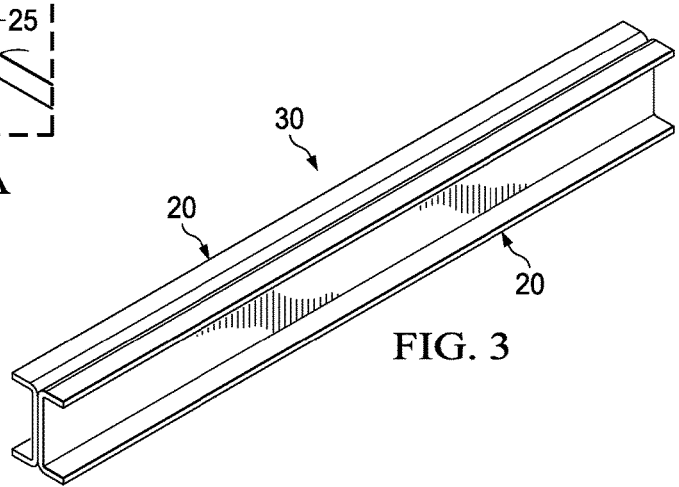
FIG. 3 is an illustration of a perspective view of an I-beam produced by assembling two of the U-shaped channel stiffeners shown in FIG. 2.

Referring first to FIGS. 1 and 2, a multi-ply, composite laminate charge 28 may be formed into a laminate part such as a U-shaped channel stiffener 20 using a hot drape forming (HDF) process. The laminate charge 28 may comprise, without limitation, a carbon fiber reinforced plastic (CFRP). The composite laminate stiffener 20 may have a wide variety of applications. For example, two of the stiffeners 20 may be joined together back-to-back as shown in FIG. 3 to form an I-beam that may be used for example and without limitation, in the aircraft industry as a wing spar 30. The stiffener 20 comprises a web 22 and a pair of flanges 24, 26 that transition outwardly from the web 22 along an inside corner radius 25. The U-shaped channel stiffener 20 described above is merely exemplary of a wide variety of composite laminate structures having features such as the inside corner radius 25 that may result in gathering or bunching of the plies during the HDF process.

Figure 4:
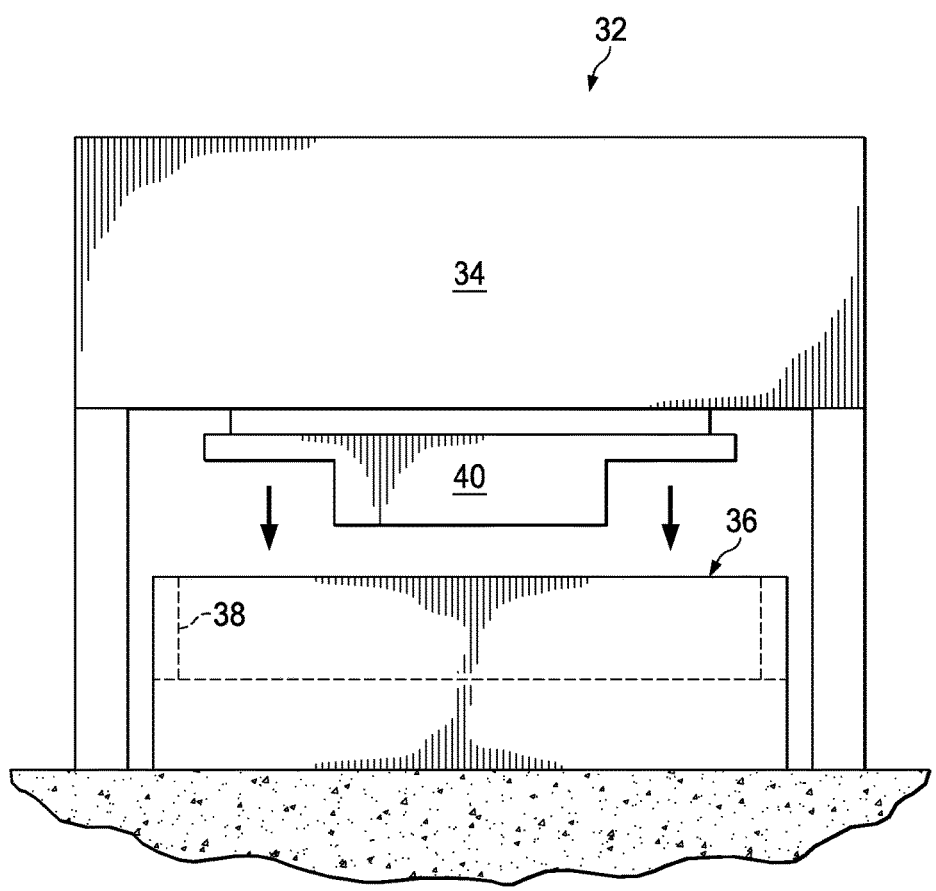
FIG. 4 is an illustration of a front view of a hot drape forming machine.

Referring now to FIG. 4, the stiffener 20 shown in FIGS. 2-3 may be formed in an HDF machine 32. The HDF machine 32 broadly comprises a former 34, a forming table 36 having a peripheral lower frame 38, and a mandrel-like, male forming tool 40 over which a composite laminate charge 28 (FIG. 1) is formed after being heated to forming temperature. As shown in FIG. 5, the forming table 36 includes a support base 42 having an integrated heating element 46 for heating the laminate charge 28 to forming temperature. Although not shown in the Figures, indexing devices may be provided for indexing the location of a laminate charge 28 placed on the support base 42.

Referring to FIGS. 5, 6 and 6A, a forming membrane 48 comprising a flexible, stretchable material such as, without limitation, a silicone, is stretched over the support base 42 within the lower frame 38. In preparation for carrying out an HDF operation, a substantially flat composite laminate charge 28 is placed on the forming table 36, in face-to-face, overlying contact with the forming membrane 48. The support base 42 provides a surface for supporting the laminate charge 28 thereon. As previously mentioned, indexing devices may be used to locate the laminate charge 28 in a desired position of the support base 42. Next, as shown in FIG. 6B, tensioning material 52 is placed over the laminate charge 28. The tensioning material 52 extends outwardly beyond the outer periphery 55 of the laminate charge 28 to the lower frame 38, and overlaps forming membrane 48.

Depending upon the application as well as the size/geometry of the laminate charge 28, the tensioning material 52 may comprise a plurality of individual tensioning sheets 52a which, in the illustrated example, are generally rectangular in shape and extend transversely across the width of the laminate charge 28. The adjacent edges of the sheets 52a may abut or overlap each other. The tensioning material 52 comprises a stretchable material having a preselected tensile strength which, when exceeded may result in the tensioning material 52 tearing or separating. The tensioning material 52 also possesses tack which allows it to adhere to the underlying the forming membrane 48. In one embodiment, the tensioning material 52 may comprise a resin impregnated cloth such as, without limitation, an epoxy impregnated fiberglass woven cloth.

Referring now to FIG. 6C, with the tensioning material 52 installed over the laminate charge 28, the outer perimeter 65 of the tensioning material 52 is retained during the forming process. In one embodiment, the tensioning material 52 is retained by placing a plurality of individual weights 54 on the tensioning material 52, which load the perimeter 65 of the tensioning material 52 against the forming membrane 48 and support base 42. The weights 54 may comprise, for example and without limitation, bags filled with a relatively heavy material such as lead shot. Other techniques for retaining the outer perimeter 65 of the tensioning material 52 are possible. Depending upon the application, the entire perimeter 65 of the tensioning material 52 is loaded using individual weights 54, as shown in FIG. 6D. As best seen in FIG. 7, the loading provided by the weights 54 places the tensioning material in tension, drawing it down against the laminate charge 28.

Attention is now directed to FIGS. 8-11 which sequentially illustrate a process of hot drape forming the laminate charge 28 into the U-shaped channel stiffener 20 (FIG. 2) using the HDF machine 32 shown in FIG. 4. As illustrated in FIG. 8, a forming tool 40 is moved onto the forming table 36 and placed on top of the laminate charge 28, thereby sandwiching the tensioning material 52 between the bottom face 53 of the tool 40, and the laminate charge 28. The forming tool 40 also includes oppositely facing sides 40b, and a pair of laterally extending flanges 40a. With the forming tool 40 on top of the laminate charge 28, an upper frame 44 is then lowered onto and sealed against the lower frame 38. A membrane 50 stretched across and sealed to the upper frame 44, creates, together with the forming membrane 48, a substantially vacuum tight cavity 56. Although not shown in the Figures, the hot drape forming machine 32 (FIG. 4) includes a system for evacuating the cavity 56.

Figure 9:
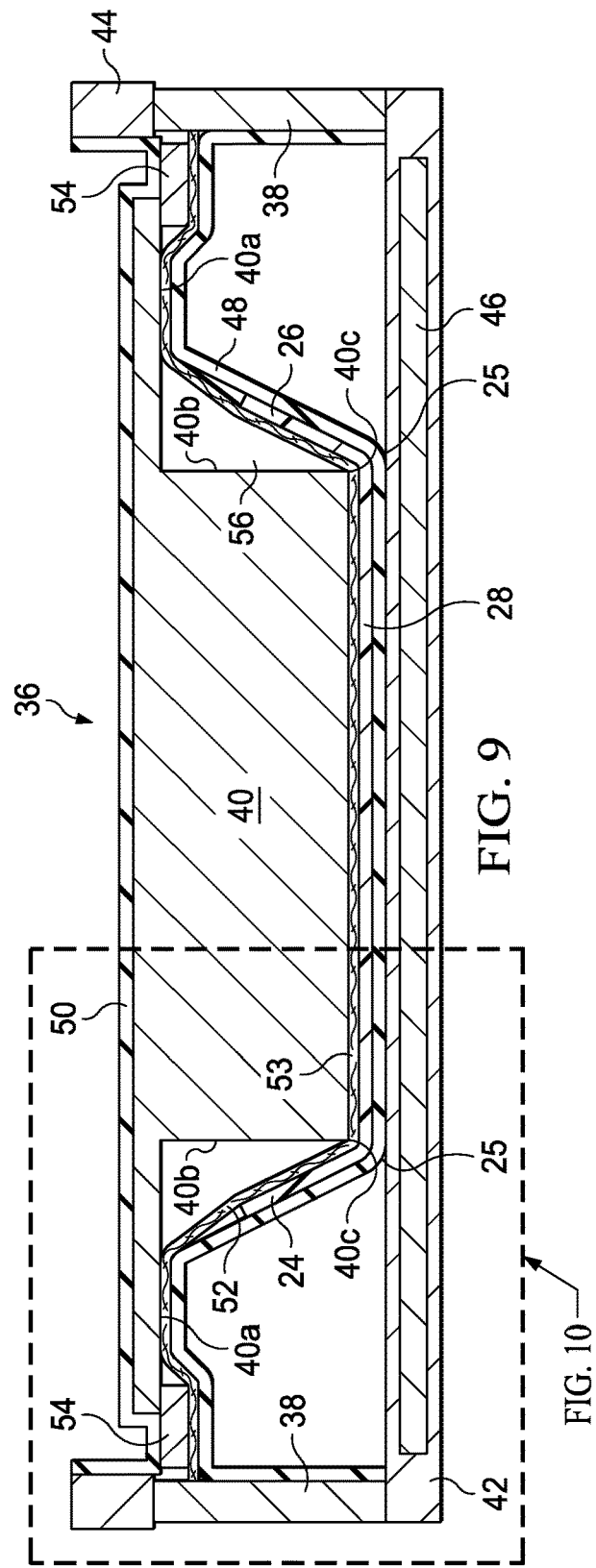
FIG. 9 is an illustration similar to FIG. 8 but showing flanges of the channel stiffener partially formed.

In preparation for an HDF operation, the heating element 46 is activated in order to heat the laminate charge 28 to a desired forming temperature. Next, a vacuum is drawn within cavity 56. Referring particularly to FIG. 9, the vacuum within cavity 56 draws the membrane 50 down against the forming tool 40, while the forming membrane 48 is drawn upwardly against the outer flanges 40a. The forming membrane 48 also begins forming the flanges 24, 26 of the laminate charge 28, rotating them about corners 40c of the tool 40 to form the corner radii 25. The forming membrane 48 stretches and moves upwardly and outwardly, conforming to the lower frame 38, while both the tensioning material 52 and the weights 54 move upwardly. This upward movement of the tensioning material 52 presses the tensioning material 52 against the tool flanges 40a.

Figure 10:
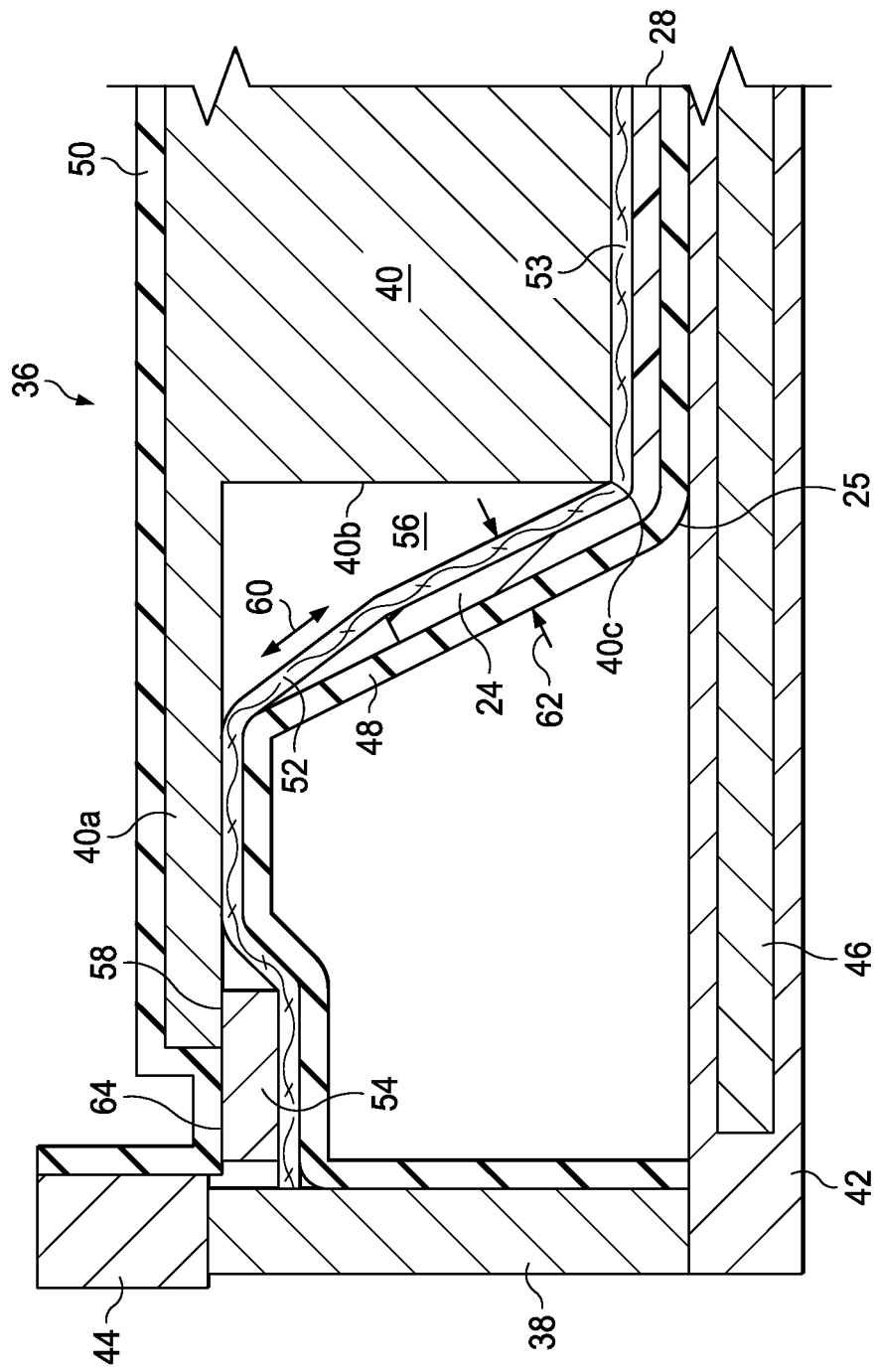
FIG. 10 is an illustration of the area designated as FIG. 10 in FIG. 9.

Referring particularly to FIGS. 9 and 10, as the forming membrane 48 stretches and moves upwardly, folding the flanges 24, 26, it tensions 60 the material 52, and, to some degree, may slightly stretch the material 52. The tension 60 in the tensioning material 52 compresses and loads 62 the flanges 24, 26 against the forming membrane 48. The compression loading 62 of the flanges 24, 26 against the forming membrane 48 maintains the plies of the flanges 24, 26 (particularly those plies closest to the tool 40) substantially flat, thereby reducing or eliminating any tendency of these plies to bunch, gather, collect or otherwise move out of plane as forming of the flanges 24, 26 continues.

Figure 11:
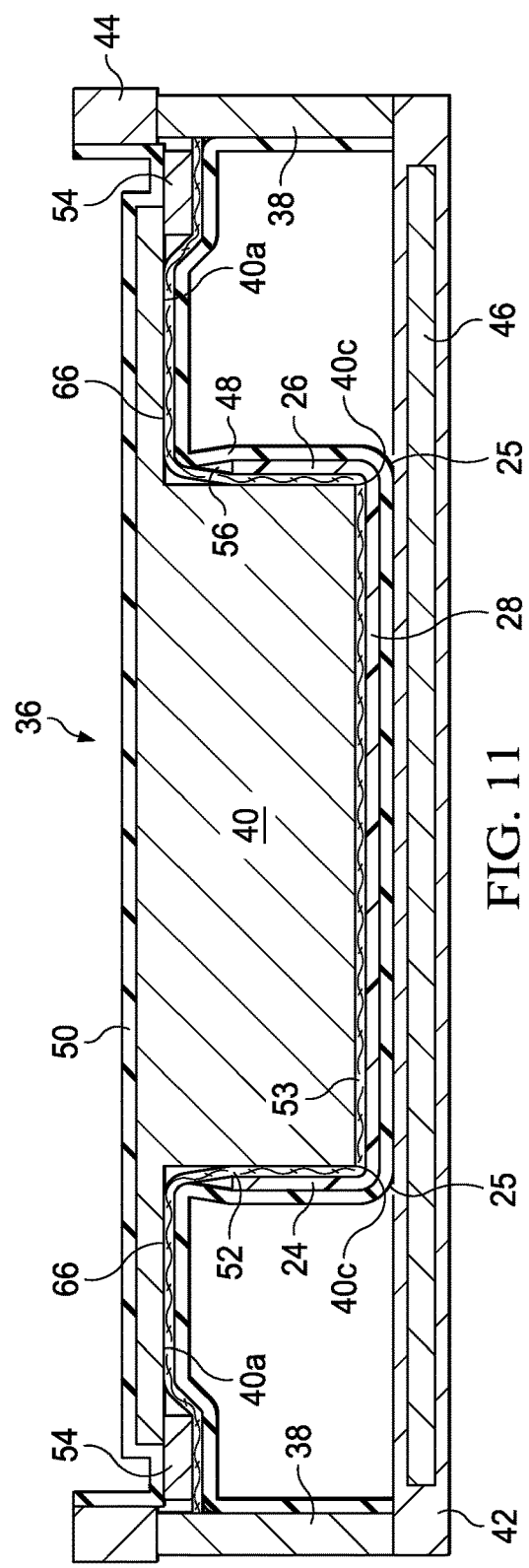
FIG. 11 is an illustration similar to FIG. 9, but showing the flanges having been fully formed and the tensioning material partially torn.

Referring now to FIG. 11, the tensioning material 52 maintains a compression load 62 on the flanges 24, 26 to prevent ply wrinkling until each of the corner radii 25 is substantially fully formed. As the vacuum in the cavity 56 continues to increase and forming membrane 48 continues forming the flanges 24, 26 toward the sides 40b (FIG. 9) of the forming tool 40, the force applied by the forming membrane 48 to the tensioning material 52 increases until the tension 60 exceeds the tensile strength of the tensioning material 52, resulting in the tensioning material 52 tearing or separating 66 in the area of the tool flanges 40a. These tears or separations 66 in the tensioning material 52 release the tension 60 in the tensioning material 52, thereby eliminating resistance to the continued inward forming movement of forming membrane 48 toward the tool 40, allowing continued forming of the flanges 24, 26 toward the sides of 40b of the forming tool 40.

Figure 12:
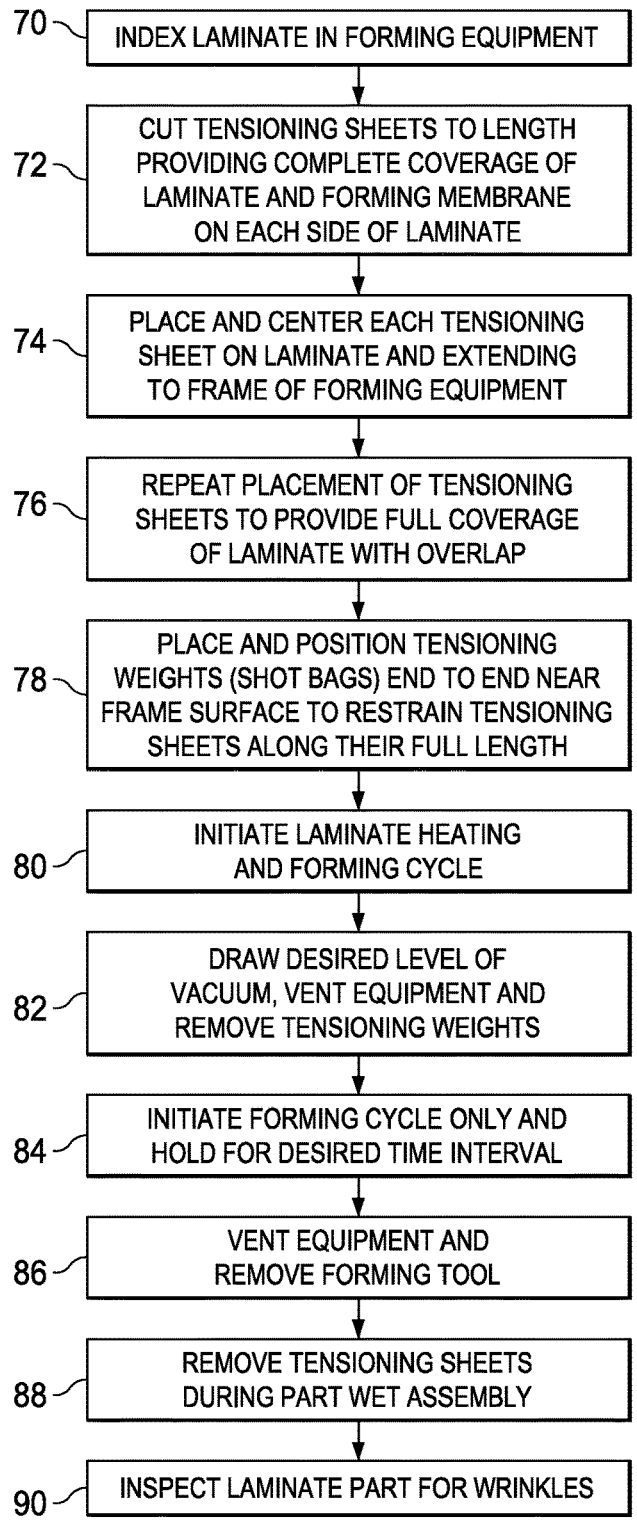
FIG. 12 is an illustration of a flow diagram of a method of hot drape forming a composite laminate charge.

Attention is now directed to FIG. 12 which illustrates additional details of one embodiment of a method of hot drape forming a composite laminate part that reduces or eliminates ply wrinkling in radius areas. Beginning at step 70, a suitable multi-ply composite laminate charge is placed and indexed in suitable forming equipment, such as an HDF machine 32. At 72, tensioning material 52 is cut into individual sheets 52a of a desired length. The number of tensioning sheets 52a that are cut is sufficient to provide complete coverage of the laminate charge 28 and the forming membrane 48 on each side of the charge 28. At step 74, each sheet 52a is placed and centered on the laminate charge 28, extending outwardly beyond the periphery of the charge 28 to the forming frame. At 76, additional sheets 52a of the tensioning material 52 are placed in order to provide full coverage of the laminate charge 28 with a desired overlap of the sheets 52a. At 78, tensioning weights 54, such as shot bags, are positioned and placed end-to-end, near the frame 38 in order to retain the sheets 52a of tensioning material 52 along their full length.

At step 80, a laminate heating and forming cycle is initiated, beginning with heating of the laminate charge. At 82, a desired level of vacuum is drawn in the cavity 56, the HDF machine 32 is vented, and the tensioning weights 54 are removed. At step 84, a forming cycle is initiated and held for a desired time interval. At 86, the HDF machine 32 is vented, releasing the vacuum in the cavity 56, and the forming tool 40 is removed. Then, at 88, the sheets 52a of tensioning material 52 are removed. Finally, at step 90, the formed laminate part may be inspected for wrinkles.

Figure 2A:
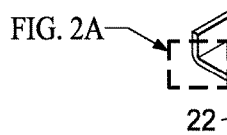
FIG. 2A is an illustration of the area designated as FIG. 2A in FIG. 2.
Figure 13:
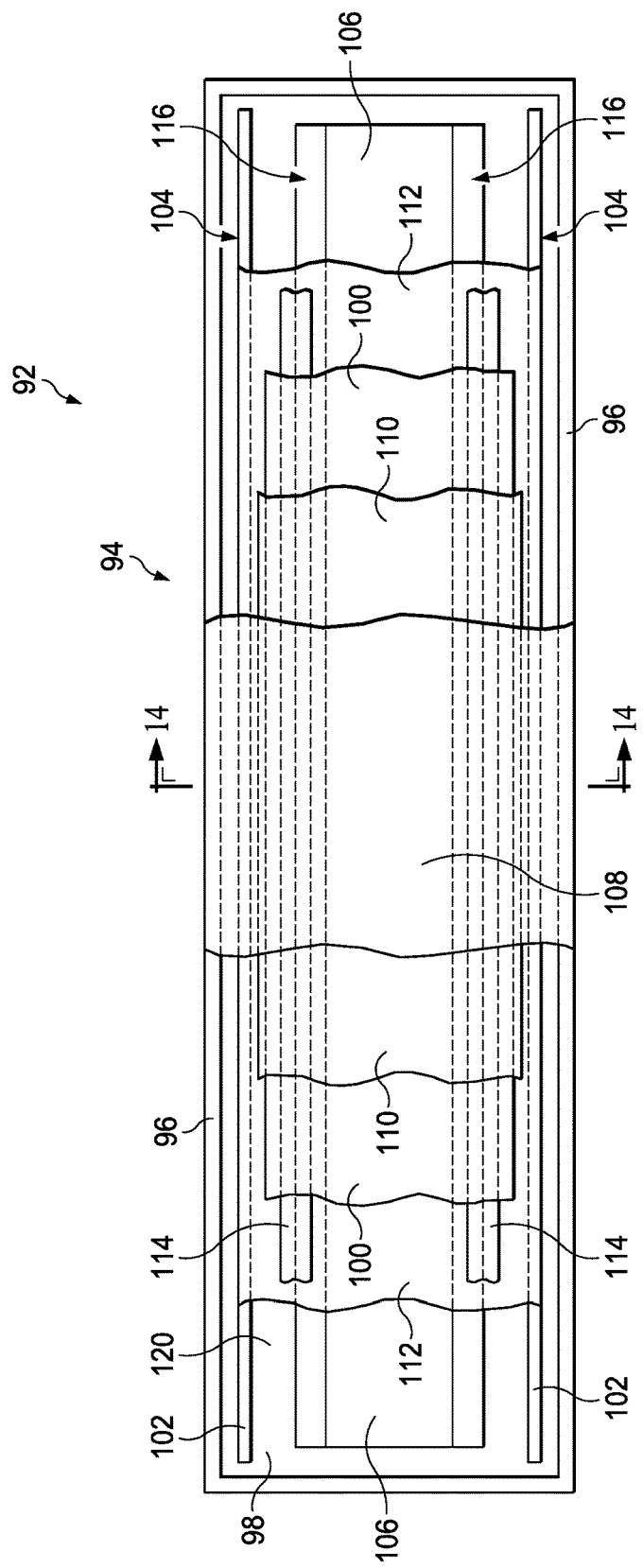
FIG. 13 is an illustration of a plan view of an alternate form of a hot drape forming machine, layers of materials being broken away in section for clarity.

The HDF machine 32 described above employs a "bottoms-up" forming technique. In some applications, it may be necessary or desirable to use a "top-down" forming method in which a laminate charge is formed downwardly over a forming tool. FIGS. 13, 14 and 15 illustrate an "upright" HDF machine 92 suitable for practicing top-down forming of a composite laminate charge 100 into a composite laminate part such as, without limitation, the composite stiffener 20 shown in FIG. 2. The HDF machine 92, sometimes hereinafter referred to as a former 92, is particularly well-suited for forming composite laminate structures having one or more inside radius corners 25 (see FIG. 2A), especially tight inside corners having a relatively short radial length.

The former 92 broadly includes a forming tool 106, a pair of laterally spaced-apart tensioning towers 102 and a forming table 94 having a support base 98 on which the forming tool 106 and tensioning towers 102 are supported. The forming tool 106 includes a top face 106a and a pair of sides 106b that intersect at outside radius corners 116 which respectively substantially match the geometry of the inside radius corners 25 of the laminate part 20. Although not shown in the figures, the forming tool 106 may include one or more heating elements for heating the tool 106 to a laminate forming temperature, and one or more indexing devices for indexing a composite laminate charge 100 in a desired position on the tool 106. The tensioning towers 102 may be formed of any suitable rigid material, and are respectively located on opposite sides 106b of the forming tool 106. The tensioning towers 102 include longitudinally extending, upper surfaces 104 that are laterally spaced apart from the sides 106b of the forming tool 106. The upper surfaces 104 of the tensioning towers 102 extend substantially parallel to each other and parallel to the sides 106b of the forming tool 106.

The forming table 94 includes a pair of longitudinally extending, substantially parallel sidewalls 96 that are located respectively outboard of, and are slightly taller than the tensioning towers 102. A flexible, stretchable forming membrane 108, sometimes called a vacuum membrane 108, is sealed to the top of the sidewalls 96 and extends across the top face 106a of the forming tool 106. The sidewalls 96 and the forming membrane 108 form an assembly that is separable from the base 98 along an interface 103 between the sidewalls 96 and the base 98. The sidewalls 96 are sealed to the base 98 along the interface 103 to form a vacuum cavity 120 inside the forming table 94 that surrounds the forming tool 106. The forming membrane 108 may be similar in construction to the forming membrane 48 previously described in connection with the embodiment shown in FIGS. 7-11. For example, the forming membrane 48 may comprise a silicone-based material. Although not shown in the figures, a vacuum generator is coupled with the forming table 94 for evacuating the vacuum cavity 120.

A first tensioning material, which may be in the form of a tensioning film 112, is stretched across the top face 106a of the forming tool 106 and has opposite edges that overlie and are fixed to the upper surfaces 104 of the tensioning towers 102. The tensioning film 112 may comprise a flexible, stretchable material suitable for the application, such as, for example and without limitation, ETFE (ethylene tetrafluoroethylene). A second tensioning material, which may be in the form of a pair of laterally spaced apart tensioning strips 114 is located on top of the tensioning film 112. Each of the tensioning strips 114 is formed of a material that exhibits adhesive properties or "stickiness" on both sides thereof which cause the strips 114 to adhere or "stick" to materials brought into contact with them, which in this application comprise the tensioning film 112 and the laminate charge 100. Each of the strips 114 has a width 118 (FIG. 15) that is sufficient to extend from the top face 106a around the outside radius corners 116 and at least partially over the sides 106b of the forming tool 106. The tensioning strips 114 are respectively aligned with and overlie the outside radius corners 116 of the forming tool 106.

In one embodiment, the tensioning strips 114 may comprise a resin impregnated reinforcement such as, without limitation, fiberglass or carbon fiber prepreg which exhibits sufficient tack to adhere or stick the strip to the tensioning film 112 and to the laminate charge 100. In another embodiment, the tensioning strips 114 may comprise a layer or coating (not shown) of a suitable material that is adhered to, or is formed on the tensioning film 112. In this latter embodiment, the layer or coating should have enough adherence to stick the strips 114 to the tensioning film 112 and the laminate charge 100. In still other embodiments, the desired adhesion between the laminate charge 100 and the tensioning film 112 may be achieved by a surface treatment of the tensioning film 112 that causes the tensioning film to adhere directly to the laminate charge 100 in the area of the outside corner radius 116. A variety of other embodiments of the second tensioning material (i.e. strips 114) are possible which effectively stick the laminate charge 100 to the tensioning film 112 in the area of the outside radius corner 116 throughout the laminate forming process, and which are capable of transferring tension loads from the tensioning film 112 to the laminate charge 100.

A multi-ply composite laminate charge 100 overlies both the tensioning film 112 and the tensioning strips 114, and spans the top face 106a of the forming tool 106. As best seen in FIGS. 14 and 15, medial portions 125 of the laminate charge 100 are in direct face-to-face contact with the tensioning film 112, while the outer edges 127 of the laminate charge 100 overlie the tensioning strips 114. Depending on the application, one or more layers of barrier film 110 such as, without limitation, FEP (fluorinated ethylene propylene), may be placed over the laminate charge 100 to isolate the laminate charge 100 from direct contact with the forming membrane 108. A pair of inflatable bladders 122 located above the forming membrane 108 respectively overlie the forming membrane 108 and tensioning film 112, and extend along the length of the tensioning towers 102. The inflatable bladders 122 are aligned with the top surfaces 104 and function, when inflated, to press the tensioning film 112 against the upper surfaces 104 of the tensioning towers 102, thereby firmly fixing the tensioning film 112 in place, stretched between the tensioning towers 102.

As a vacuum is drawn within the vacuum cavity 120, inflatable bladders 122 clamp the outer edges of the tensioning film 112 against the tensioning towers 102 while the force applied by the forming membrane 108 stretches the tensioning film 112 down into the vacuum cavity 120 as the laminate charge 100 is being formed. It should be noted here that a variety of other devices or mechanical means, such as, without limitation, mechanical clamps, may be employed to apply the clamping force that fixes the outer edges of the tensioning film 112 against the tensioning towers 102 to prevent the tensioning film 112 from slipping on the tensioning towers 102 during the forming process.

Referring now to FIGS. 16-19, in use, the tensioning film 112 is stretched between the tensioning towers 102, overlying the top face 106a of the forming tool 106. In some embodiments, as previously discussed, the outer edges of the tensioning film 112 may be fixed (held against movement) on the upper surfaces 104 of the tensioning towers 102 by inflatable bladders 122, an adhesive, clamps or other holding means. Next, the tensioning strips 114 are placed on the tensioning film 112, aligned over the outer radius corners 116. Then, the laminate charge 100 is placed on the forming tool 106, such that the outer edges 127 of the charge 100 are in contact with the tensioning strips 114 and the medial portion 125 is in face-to-face contact with the tensioning film 112. As previously indicated, one or more barrier film layers 110 may be placed over the laminate charge 100 to isolate the charge 100 from the forming membrane 108. The forming membrane 108 is then installed over the forming table 94, extending between and sealed to the sidewalls 96. The inflatable bladders 122, or other suitable clamping means, are installed above the upper surfaces 104 of the tensioning towers 102, overlying the forming membrane 108.

Figure 18:
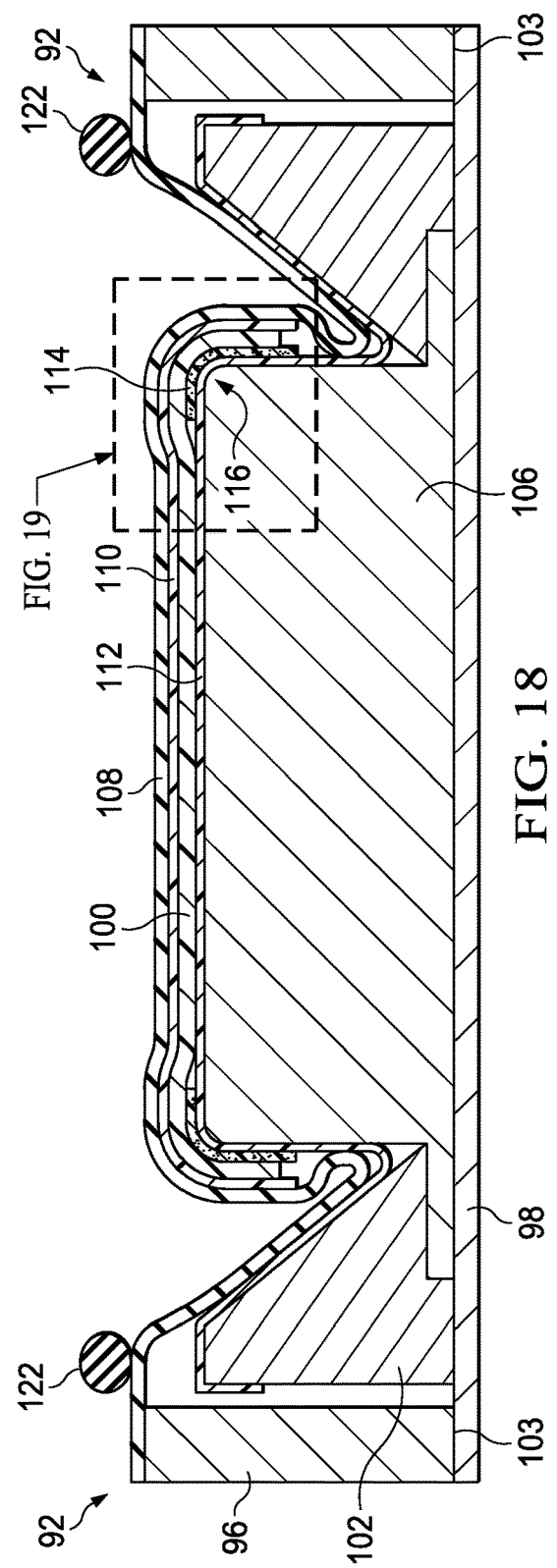
FIG. 18 is an illustration of view similar to FIG. 16, but showing the composite laminate charge having been fully formed during a final stage of the forming process, bulging of the material layers near the radius outside corners of the tool exaggerated for clarity.
Figure 19:
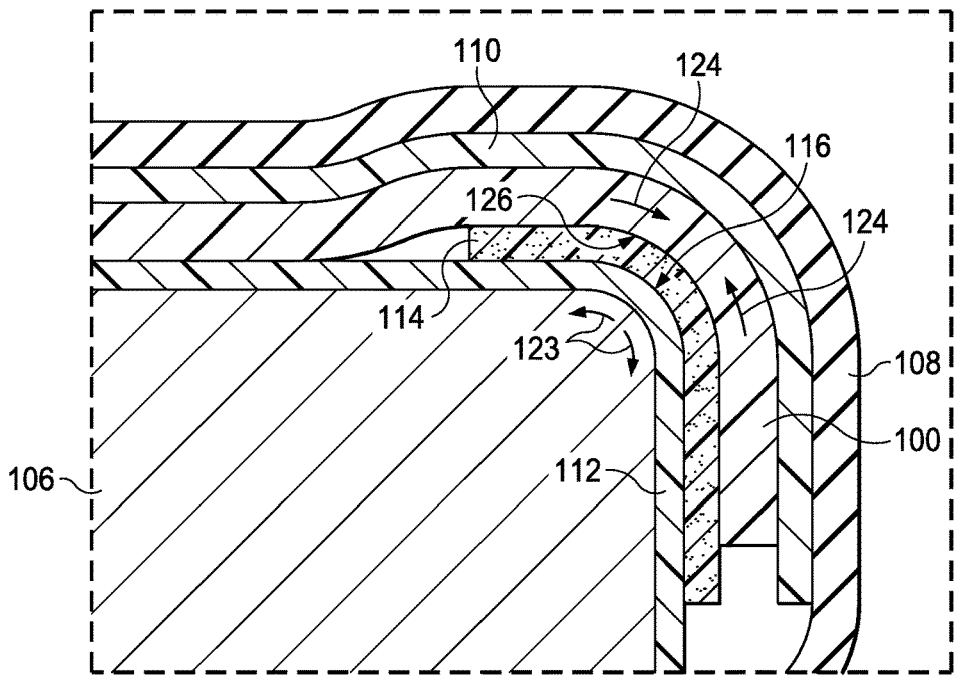
FIG. 19 is an illustration of the area designated as FIG. 19 in FIG. 18.

A forming operation is commenced by heating the laminate charge 100 to its forming temperature, and then slowly ramping evacuation of the vacuum cavity 120. The vacuum force generated by evacuation of the vacuum cavity 120 draws the forming membrane 108 down onto the laminate charge 100 (FIGS. 16 and 17), clamping the charge against the top face 106a of the forming tool 106. As evacuation of the vacuum cavity 120 continues, the forming membrane 108 stretches and is drawn down into the vacuum cavity 120, forcing the outer edges 100a of the laminate charge 100 to form down over the outside radius corners 116 and then onto the sides 106b of the forming tool 106 (FIGS. 18 and 19).

As the laminate charge 100 is formed down around and onto the outside radius corner 116 of the forming tool 106, the plies of the laminate charge 100 that are closest to the IML 126 experience an in-plane compression force 124 due to these plies being constrained between the outer plies of the laminate charge 100 and the forming tool 106. The adhesion of the tensioning strips 114 to both the IML 126 of the laminate charge 100 the outside radius corner 116 of the forming tool 106 links the tensioning film 112 to the laminate charge 100. As a result of this linking, the tension in the tensioning film 112 is transferred through the tensioning strips 114 into the IML 126, resulting in a tension force 123 being applied to the IML 126 which reduces or substantially cancels the compression force 124 in the plies nearest the IML 126. The reduction or canceling of the compression force 124 reduces or eliminates gathering, bunching or wrinkling of the plies near the IML 126.

Separating the second tensioning material into individual, spaced apart tensioning strips 114 (shown in FIGS. 13-19) allows the tensioning strips 114 to move independently of each other at the outside radius corners 116, thereby better linking the laminate charge 100 tensioning film 112. Nevertheless, in some embodiments, it may be possible to use a single sheet of the second tensioning material such as a sheet of prepreg to span the entire width of the laminate charge 100, providing that the tensile resistance of the prepreg sheet does not substantially reduce the tension force 123 that is applied to the laminate charge 100 at the outside radius corners 116.

Figure 20:
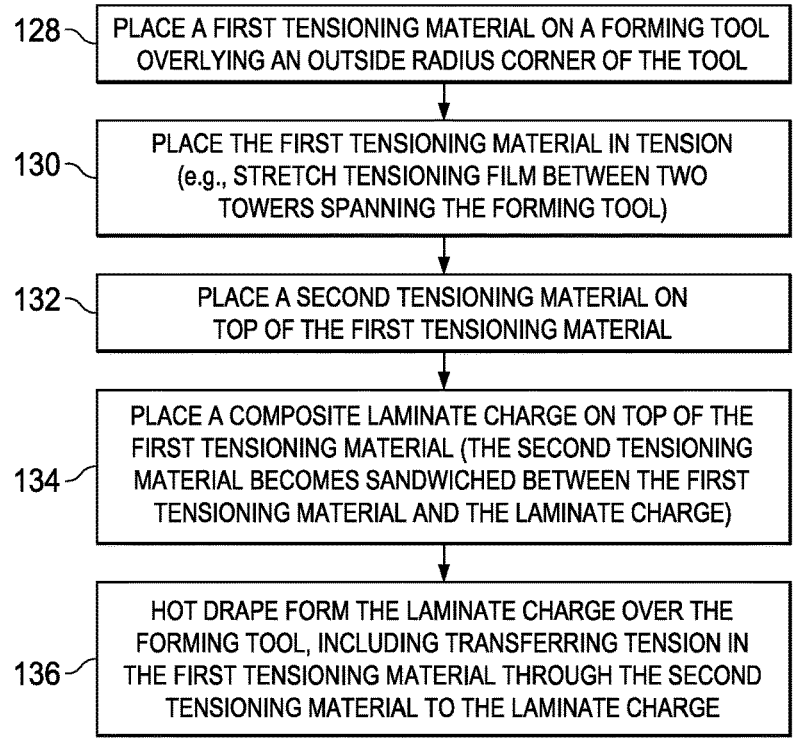
FIG. 20 is an illustration of a flow diagram of a method of hot drape forming of a composite laminate.

Attention is now directed to FIG. 20 which broadly illustrates the overall steps of a method of hot drape forming a composite laminate charge 100 on a forming tool 106 having at least one outside radius corner 116 for forming a corresponding inside radius corner 25 of a part 20. At 128, a first tensioning material, which may comprise a tensioning film 112 as described above, is placed on the forming tool 106, overlying the outside radius corner 116 of the tool 106. At 130, the first tensioning material 112 is placed in tension 123, as by placing a stretchable tensioning film 112 between two towers 102 respectively on opposite sides of the forming tool 106.

At 132, a second tensioning material, which may comprise tensioning strips 114 previously described, is placed on top of the first tensioning material 112 and the laminate charge 100. At 134, a composite laminate charge 100 is placed on the forming tool 106, overlying the first tensioning material 112. The second tensioning material 114 is sandwiched between the first tensioning material 112 and the laminate charge 100.

Finally, at 136, the laminate charge 100 is hot drape formed over the forming tool 106. During this forming step, tension in the first tensioning material 112 is transferred through the second tensioning material 114 to the laminate charge 100 to prevent wrinkling of those plies of the laminate charge 100 that are nearest to the IML 126 of the part 20.

Figure 21:
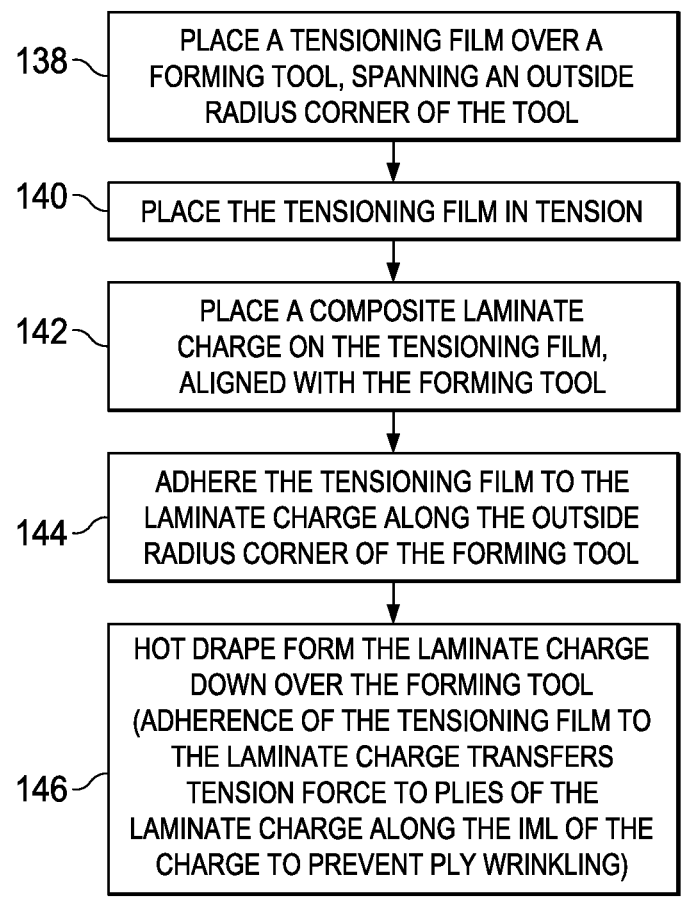
FIG. 21 is an illustration of a flow diagram of another embodiment of a method of hot drape forming a composite laminate charge on a forming tool having at least one outside radius corner.

FIG. 21 illustrates an alternative embodiment of a method of hot drape forming composite laminate parts 20 having one or more inside radius corners 25, wherein ply wrinkling along the inside radius corners 25 at the IML 126 is reduced or eliminated. At 138, a tensioning film 112 is placed over a forming tool, spanning an outside radius corner 116 of the tool 106. At 140 the tensioning film 112 is placed in tension, and ten at 142, a composite laminate charge 100 is placed on the tensioning film 112, aligned with the forming tool 106. At 144, the tensioning film is adhered to the laminate charge 100 along the outside radius corner 116 of the forming tool 106. At 146 the laminate charge 100 is formed down over the forming tool 106, as by using a hot drape forming process. The adherence of the tensioning film 112 to the laminate charge transfers tension force 123 to the plies of the laminate charge 100 along the IML 126 of the charge 100 in order to prevent ply wrinkling.

Figure 22:
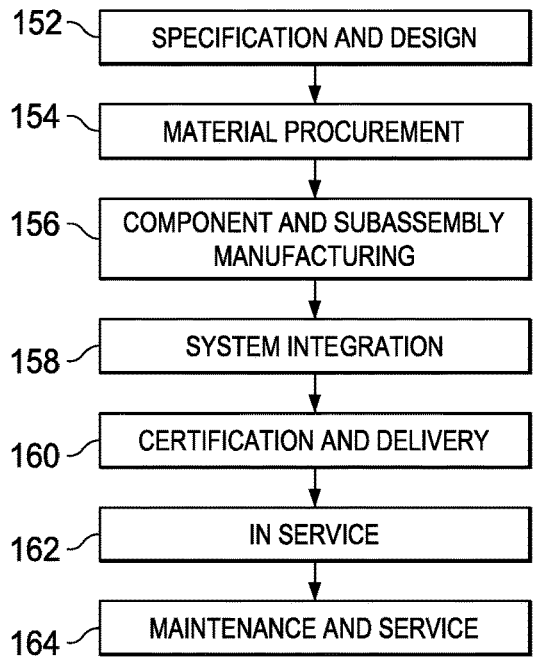
FIG. 22 is an illustration of a flow diagram of aircraft production and service methodology.
Figure 23:
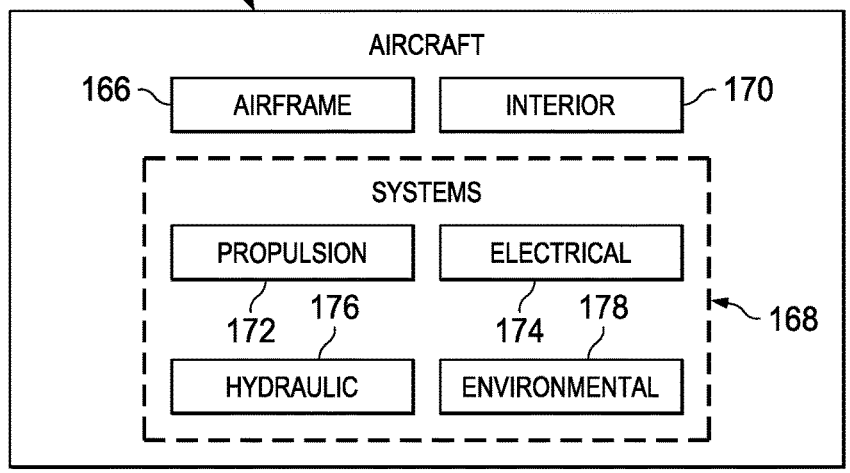
FIG. 23 is an illustration of a block diagram of an aircraft.

Embodiments of the disclosure may find use in a variety of potential applications, particularly in the transportation industry, including for example, aerospace, marine, automotive applications and other application where composite laminate parts are fabricated by hot drape forming or by similar processes. Thus, referring now to FIGS. 22 and 23, embodiments of the disclosure may be used in the context of an aircraft manufacturing and service method 148 as shown in FIG. 22 and an aircraft 150 as shown in FIG. 23. Aircraft applications of the disclosed embodiments may include, for example, without limitation, spars, stringers, floor beams and similar stiffeners, to name only a few. During pre-production, exemplary method 148 may include specification and design 152 of the aircraft 150 and material procurement 154. During production, component and subassembly manufacturing 156 and system integration 158 of the aircraft 150 takes place. Thereafter, the aircraft 150 may go through certification and delivery 160 in order to be placed in service 162. While in service by a customer, the aircraft 150 is scheduled for routine maintenance and service 164, which may also include modification, reconfiguration, refurbishment, and so on.

Each of the processes of method 148 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 150 produced by exemplary method 148 may include an airframe 166 with a plurality of systems 168 and an interior 170. Examples of high-level systems 168 include one or more of a propulsion system 172, an electrical system 174, a hydraulic system 176, and an environmental system 178. Any number of other systems may be included. Although an aerospace example is shown, the principles of the disclosure may be applied to other industries, such as the marine and automotive industries.

Systems and methods embodied herein may be employed during any one or more of the stages of the production and service method 148. For example, components or subassemblies corresponding to production process 156 may be fabricated or manufactured in a manner similar to components or subassemblies produced while the aircraft 150 is in service. Also, one or more apparatus embodiments, method embodiments, or a combination thereof may be utilized during the production stages 156 and 158, for example, by substantially expediting assembly of or reducing the cost of an aircraft 150. Similarly, one or more of apparatus embodiments, method embodiments, or a combination thereof may be utilized while the aircraft 150 is in service, for example and without limitation, to maintenance and service 164.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of hot drape forming a composite laminate charge on a forming tool that reduces ply wrinkling, comprising:
    placing a first tensioning material on the forming tool;
    placing the first tensioning material in tension;
    placing a second tensioning material directly atop the first tensioning material;
    adhering the second tensioning material directly to the first tensioning material;
    after adhering the second tensioning material to the first tensioning material, placing a composite laminate charge overlying and in direct contact with both the first tensioning material and the second tensioning material;
    adhering the second tensioning material directly to the composite laminate charge; and
    hot drape forming the laminate charge over the forming tool, including transferring the tension in the first tensioning material through the second tensioning material to the laminate charge.

2. The method of claim 1, further comprising:
    placing a forming membrane over the first tensioning material and the laminate charge; and
    generating a forming force by drawing a vacuum beneath the forming membrane, wherein forming the laminate charge over the forming tool is performed using the forming force generated by the forming membrane.

3. The method of claim 1, further comprising:
holding opposite edges of the first tensioning material against movement; and
stretching the first tensioning material down onto sides of the forming tool.

4. The method of claim 3, further comprising:
placing the first tensioning material on spaced-apart towers each having an upper surface;
holding the opposite edges of the first tensioning material respectively against the upper surfaces of the towers;
placing a vacuum membrane over the first tensioning material; and
drawing a vacuum beneath the vacuum membrane.

5. The method of claim 1, wherein placing the second tensioning material includes placing a strip of prepreg on the first tensioning material aligned with a corner of the forming tool.

6. The method of claim 1, further comprising:
placing the forming tool on a forming table having first and second, opposite sidewalls, and a base;
placing first and second spaced apart towers on the base, wherein each of the towers is disposed between the forming tool and one of the first and second sidewalls;
placing a forming membrane over the forming tool; and
forming a vacuum cavity, including sealing the first and second sidewalls to the base.

7. The method of claim 1, wherein the first tensioning material is a stretchable, ethylene tetrafluoroethylene film.

8. The method of claim 1, further comprising:
after hot drape forming the laminate charge over the forming tool, removing the first tensioning material from the laminate charge.

9. A method of hot drape forming a composite laminate part on a forming tool having at least one outside radius corner, comprising:
placing a tensioning film over the forming tool and spanning the outside radius corner;
placing the tensioning film in tension;
placing an adhesive directly atop the tensioning film and aligned with the outside radius corner;
placing a composite laminate charge on the tensioning film aligned with the forming tool overlying and in direct contact with both the tensioning film and the adhesive;
adhering the tensioning film to the laminate charge along the outside radius corner of the forming tool; and
forming the laminate charge down over the forming tool.

10. The method of claim 9, wherein placing the tensioning film in tension includes:
holding opposite edges of the tensioning film on a pair of towers, and
stretching the tensioning film down over the forming tool as the edges are being held on the pair of towers.

11. The method of claim 9, wherein the tensioning film is a stretchable, ethylene tetrafluoroethylene film.

12. The method of claim 9, further comprising:
after forming the laminate charge down over the forming tool, removing the tensioning film from the laminate charge.

13. A method of hot drape forming a composite laminate part on a forming tool having at least one outside radius corner, comprising:
placing a tensioning film over the forming tool and spanning the outside radius corner;
placing the tensioning film in tension;
treating a surface of the tensioning film along the outside radius corner;
placing a composite laminate charge on the tensioning film aligned with the forming tool;
adhering the tensioning film to the laminate charge along the outside radius corner of the forming tool, wherein treating the surface of the tensioning film adheres the tensioning film to the laminate charge;
forming the laminate charge down over the forming tool; and
after forming the laminate charge down over the forming tool, removing the tensioning film from the laminate charge.

14. The method of claim 13, wherein the tensioning film is a stretchable, ethylene tetrafluoroethylene film.

* * * * *